United States Patent
Reudink

(10) Patent No.: US 7,257,376 B2
(45) Date of Patent: Aug. 14, 2007

(54) SYSTEMS AND METHODS FOR MAKING CHANNEL ASSIGNMENTS TO REDUCE INTERFERENCE AND INCREASE CAPACITY OF WIRELESS NETWORKS

(75) Inventor: Douglas O. Reudink, Kirkland, WA (US)

(73) Assignee: Adaptix, Inc., Seattle, WA (US)

( * ) Notice: Subject to any disclaimer, the term of this patent is extended or adjusted under 35 U.S.C. 154(b) by 37 days.

(21) Appl. No.: 11/172,604

(22) Filed: Jun. 30, 2005

(65) Prior Publication Data

US 2007/0004420 A1    Jan. 4, 2007

(51) Int. Cl.
*H04B 1/00* (2006.01)
*H04B 15/00* (2006.01)

(52) U.S. Cl. .................. 455/63.1; 455/450; 455/509
(58) Field of Classification Search ............. 455/62, 455/63.1, 450, 452.1, 451, 509, 513
See application file for complete search history.

(56) References Cited

U.S. PATENT DOCUMENTS 5,884,145 A * 3/1999 Haartsen ............... 455/63.2
6,075,991 A * 6/2000 Raleigh et al. ............ 455/450
6,175,734 B1 * 1/2001 Desgagne et al. ......... 455/437
6,411,817 B1 * 6/2002 Cheng et al. .............. 455/522
6,983,150 B2 * 1/2006 Dixon ....................... 455/450
2005/0249322 A1 * 11/2005 Gerlach .................... 375/355

* cited by examiner

*Primary Examiner*—Joseph Feild
*Assistant Examiner*—Inder Pal Mehra
(74) *Attorney, Agent, or Firm*—Fulbright & Jaworski LLP

(57) ABSTRACT

There is disclosed a system and method for improving wireless system capacity by reducing collisions where the Signal to Interference Ratio (SIR) is high in systems having a channel reuse of 1. By ordering the channel assignment in each of the interfering cells according to a pattern, for example, according to the distance from a base station (determined by power levels), the mobile stations will become paired on the same channel in a manner to reduce interference between them. In one embodiment, this intelligent assignment is accomplished by assigning mobile stations in one cell such that the mobile station having the strongest signal is assigned channel A while in the interfering cell the mobile station with the weakest signal is assigned to channel A. In another embodiment, certain preferred mobile stations are assigned either interference-free channels or channels paired with weak interference mobile stations.

17 Claims, 2 Drawing Sheets

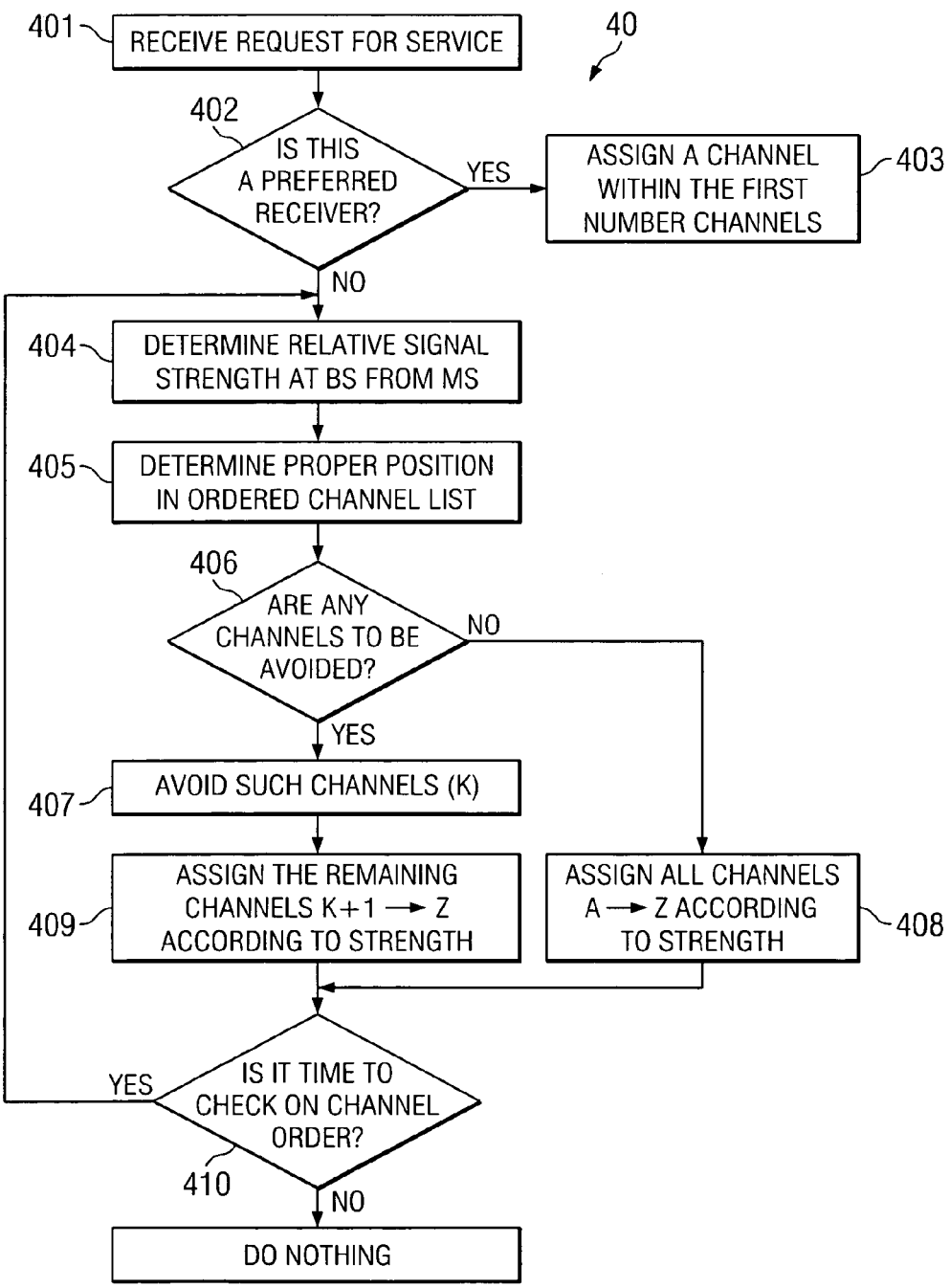

SYSTEMS AND METHODS FOR MAKING CHANNEL ASSIGNMENTS TO REDUCE INTERFERENCE AND INCREASE CAPACITY OF WIRELESS NETWORKS

TECHNICAL FIELD

This invention relates to wireless network channel assignments and more particularly to systems and methods for making such assignments in a manner to reduce interference and increase capacity in wireless networks.

BACKGROUND OF THE INVENTION

In wireless systems it is often desired to use all channels (or all of the allocated spectrums) in every cell. These systems are called N=1 reuse systems. In such systems it is possible for a mobile station (MS) to receive signals of equal power on the same channel from two base stations (BS).

Current methods of solving this problem include CDMA where different codes are transmitted by different BSs and, depending on the spreading factors, a signal can be extracted from the interference with greater reliability. Unfortunately, in such systems spreading reduces the overall through-put in direct proportion.

Another solution involves frequency hopping. In this case the BSs randomly select channels to send to the MS and if only a few mobiles are in use the chances of collisions can be made small because each channel is used only a small fraction of the time. However, as loading (increased MSs) increases, collision possibility increases until with 100% of possible users on at each BS collisions occur in every instance. The damage due to interference done at each instant depends upon the instantaneous transmitter power of the interfering BSs and the relative distances the MSs are from their respective BSs.

BRIEF SUMMARY OF THE INVENTION

There is disclosed a system and method for improving wireless system capacity by reducing collisions where the Signal to Interference Ratio (SIR) is high in systems having a channel reuse of 1. By intelligently assigning (ordering) the channel assignment in each of the interfering cells according to a pattern, for example, according to the distance from a BS, the MSs will become paired on the same channel in a manner to reduce interference between them. A second step is to optionally control the power of the BS and MS transmitter to further optimize user capacity or reduce interference.

In one embodiment, this intelligent assignment is accomplished by assigning MSs in one cell such that the MS having the strongest signal is assigned channel A while in the interfering cell, the MS with the weakest signal, is assigned to channel A. In another embodiment, certain preferred MSs are assigned either interference-free channels or channels paired with weak interference MSs.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which:

FIG. 2 shows one assignment pattern;

FIG. 4 shows one embodiment of an algorithm for assigning channels.

DETAILED DESCRIPTION OF THE INVENTION

Figure 1:
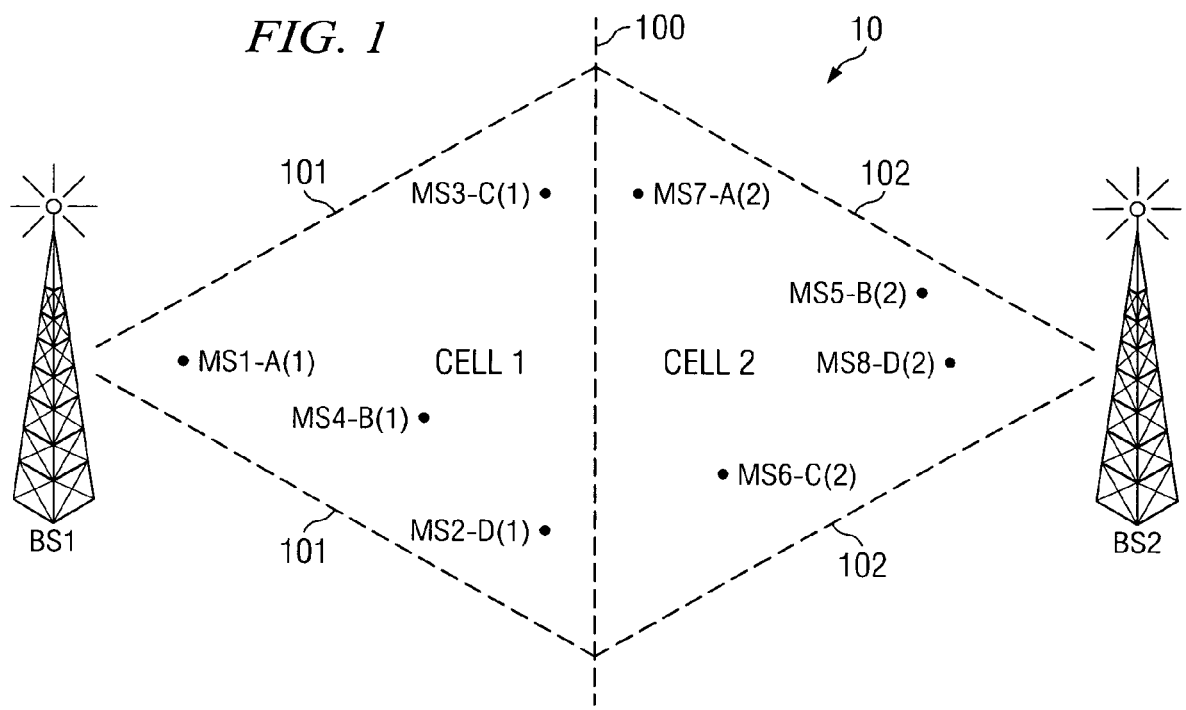
FIG. 1 shows one embodiment of wireless cells ordered according to a pattern.

FIG. 1 shows one embodiment 10 in which BS1 makes channel assignments for MSs from the nearest (strongest power levels) to the farthest (weakest power levels), while BS2 makes channel assignments to MSs from the farthest (weakest power levels) to the nearest (strongest power levels). This assignment pattern is shown in FIG. 2.

Using this channel assignment, pattern MS1-A(1) having a strong signal, is assigned channel A in cell 1. MS7 which is at the edge of cell 2, and has a relatively weak signal from BS2 is assigned the channel A in cell 2. This assignment avoids the situation where MS3 and MS7 are paired on the same channel. Were that to occur, S≈I for transmission in each direction from BS to MS and from MS to BS yielding high interference.

Each BS can make new channel assignments from time to time so that for the most part the MSs remain assigned according to their relative strength even though they are moving.

Intelligent assignments can be done in other ways to achieve different objectives. For example, some MSs can be designated as preferred users so that the preferred user will always be paired with the weakest interferer in every instance. For example, if MS4 was a preferred user it would be paired with MS7 in the example of FIG. 1.

Another objective may be to provide maximum capacity to a particular user. In such a case a clear channel could be guaranteed to the user or the user could be paired with the weakest user in the other cell.

Another objective may be to reduce interference in a cell by having a BS and/or selected MS transmit at a slower rate at reduced power.

The strategies discussed herein can be implemented at each BS without prior knowledge of the signals and interferences at the interfering BS. An alternative would be a centralized controller that has access to the signal levels and the interference levels of all MSs, and which then implements a centralized strategy, say to maximize the capacity of the entire network. In principle, a computer could evaluate every possible pairing combination and select from that a desired result such as maximum network capacity or minimizing high interference conditions.

Figure 3:
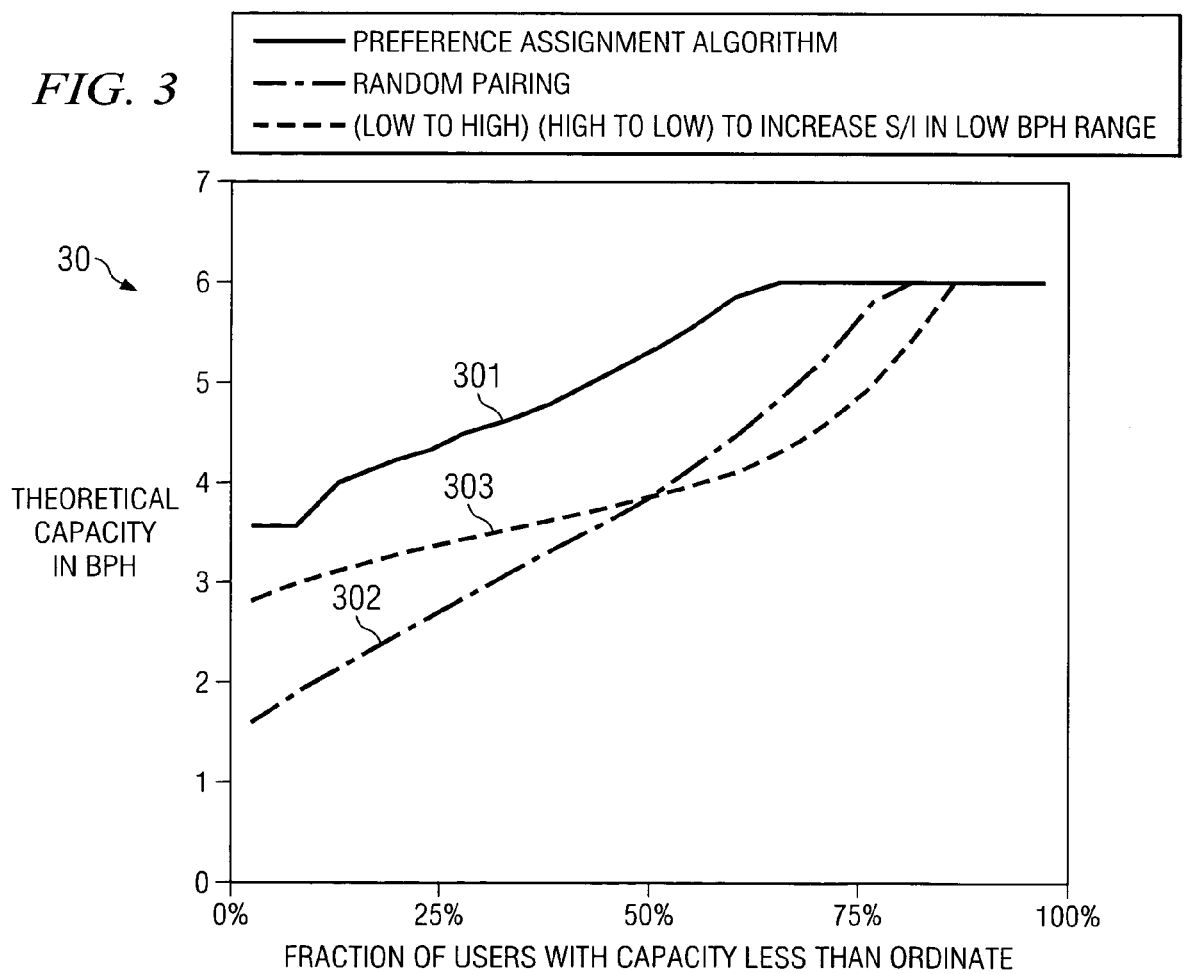
FIG. 3 shows a simulation of theoretical capacity distributions for random and intelligent channel assignment.

FIG. 3 shows simulation 30 of high to low ordering paired with the low to high (graph 303) at the interfering BS as shown in FIG. 2. Graphs 301, 302 and 303 represent the capacity distributions of the three strategies. For example, at the 25% point, this means 75% of all users enjoy capacities exceeding 4, 3 and 2.5 BPH respectively. Or looking the other way 25% of all users have capacity less than 4, 3 and 2.5 BPH. The results using 16 sub-carriers show increased bandwidth (theoretical capacity), i.e., a significant reduction in high interference events for a greater number of users over either the preference channel assignment method (graph 301) or random assignment (graph 302), all using 100% of the channels in both of the interfering cells. Note that using preference pairing (which can be a premium service available to select number of MSs) a higher capacity (graph 301) can be achieved, but for a lower number of MSs.

Graph 302 shows, for example, a typical OFDMA system where individual MS are assigned a subset of all the available sub-carriers. In a typical transmission slot the BS may have available 16, 32 or more sub-channels. A sub-channel usually has several sub-carriers, each carrying independent information. Normally, the sub-channels are assigned on a first come first serve basis to the mobile users who normally are randomly distributed within their respective cells.

Pairing using graph 303 can be changed, for example, as discussed above, every 5 MS, to be sure that in cell 1 the strongest station remains on channel A, while the weakest station is on channel D, while in cell 2 the weakest station is on channel A, while the strongest is on channel D. Strongest can be defined using any convenient metric so long as the potentially interfering cells agree on the metric. One example would be using high signal to interference ratios (SIR) as a measure of strength.

Using the preference assignment cell 1 would leave, say the first 5-10% of channels open for assignment to preferred customers, and would leave the last 5-10% of channels vacant. Cell 2 would do the reverse, i.e., leave its first 5-10% of channels vacant and assign its preferred customers to the last 5-10% of channels. Also, it could be established that preferred users would always get the weakest interferences from the other cell, as discussed above. Graph 301 was simulated for the case of the preferred user being paired with the weakest interferer (weakest one out of 16 at random locations).

FIG. 4 shows one embodiment 40 of a process for assigning channels in a wireless system. Process 401 controls requests for service from a MS (user) and process 402 optionally determines if the requesting user is a preferred user. If it is then process 403 assigns a channel according to a class of service or other identifying characteristic of the MS depending upon contractual arrangements with the user.

If the requesting user is not a preferred user then process 404 determines relative signal strength, as discussed above, and process 405, following an assignment pattern as shown in FIG. 2, assigns a proper channel in conjunction with processes 406, 407, 408 and 409 which check to be sure there is no prohibition on the use of certain channels (such as, for example, would occur if certain channels were to be maintained vacant).

Process 410 controls the reassignment from time to time of the channel assignments to insure that the pattern established by FIG. 2 is maintained, at least on the average.

In one embodiment the allocated spectrum is divided into channels. A channel is defined as a portion (may be all) of the allocated spectrum being used for a specified period of time. The inventive concepts apply to FDMA, TDMA, TD-CDMA, OFDMA or combinations there of.

Note that the capacity of a BS or the capacities of certain MSs can be raised or lowered by trading power for throughput (capacity). A simple example: If a user needs less capacity, then lower the power and change the modulation rate.

$C=\log_2(1+S/N+I)$. Reduce $S$ to $\frac{1}{4}S$ and the new $C=\frac{1}{2}$ the old $C$.

Increase S to 4S and the new C is doubled.

This is a tradeoff. Every time the BS lowers power it helps the neighbor cell, but if it increases power to certain MS it causes more interference. However, if the channels that are increased in power are part of the reserved set, then it may not matter.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for assigning channels in a wireless system, said method comprising:
   determining at a given point in time in interfering cells which mobile stations (MSs) in each said cell are communicating with the highest signal strength; and
   assigning channels to said MSs based on said determined signal strength;
   wherein said assigning comprises:
   in one of said cells making the channel assignment such that a MS with a highest signal strength is assigned a particular channel and in the interfering cell the assignment is that a MS with a lowest signal strength is assigned said particular channel.

2. A method for assigning channels in a wireless system, said method comprising:
   determining at a given point in time in interfering cells which mobile stations (MSs) in each said cell are communicating with the highest signal strength; and
   assigning channels to said MSs based on said determined signal strength;
   in one of said cells making the channel assignment such that preferred MSs are assigned to certain channels and in the interfering cell said certain channels are reserved.

3. The method of claim 2 wherein said reserved channels are maintained in at least one cell without any MS assignments.

4. The method of claim 3 wherein said reserved channels are limited to a certain power level.

5. The method of claim 2 wherein the determined MSs with the weakest receiver power are assigned to said reserved channels.

6. The method of claim 2 where preferred MSs are allocated additional transmit power.

7. A method of assigning channels to MSs, said method comprising:

in a pair of potentially interfering cells, establishing an assignment order of channels such that with respect to an ordered series of channels in each cell a first cell will assign MSs to channels according to a particular assignment pattern while in the second of said cells the assignment will be in the mirror image of the assignment in said first cell, wherein said particular pattern is in the order of strongest to weakest signal strength with respect to said first cell and said channel assignment is in the order of weakest to strongest with respect to the same ordered series of channels in said second cell.

8. The method of claim 7 further comprising:

in each cell making a determination of MS signal strength on a periodic basis; and making said assignment of said MS signal according to each said determination.

9. The method of claim 8 wherein said periodic basis is on the order of 5 MS.

10. The method of claim 8 wherein said periodic basis is on the order of 10 MS.

11. The method of claim 7 wherein said particular pattern is such that a first group of channels of said ordered channels in said first cell is reserved for particular MSs and a last group of channels of said ordered channels in said second cell is reserved for said particular MSs.

12. The method of claim 11 wherein said first group of channels of said ordered channels in said second cell is reserved for the weakest signal strength receivers.

13. The method of claim 12 further comprising:

in each cell making a determination of MS signal received signal strength on a periodic basis; and making said assignment of said MSs according to each said determination.

14. The method of claim 7 further comprising:

changing from time to time the power levels of the base station (BS) with respect to certain MSs.

15. A wireless system comprising:

at least two BSs each defining a cell, said BSs using an N=1 repeat pattern;

means for determining relative signal strength among MSs communicating with each said BS; and means for assigning MSs according to a pattern designed to minimize interference between MSs in each of said cells using the same channels; and means for assigning an order to said channels in each said cell such that in one cell the weakest signal strength MSs are assigned from one end of said channel order and the strongest signal strength MSs are assigned from the other end of said channel order.

16. The system of claim 15 further comprising:

means for designating certain of said MS as preferred MSs; and means for pairing preferred MSs in one of said cells with weak signal strength MS, in the other of said cells.

17. The system of claim 16 further comprising:

means operative from time to time for modifying the power level between a BS and one or more MS, in order to optimize capacity across both of said cells.

* * * * *